(12) United States Patent
Wu et al.

(10) Patent No.: US 9,846,105 B2
(45) Date of Patent: Dec. 19, 2017

(54) HIGH-DURABILITY AND LONG-SCALE-DISTANCE FIBER GRATING SENSOR AND MANUFACTURING METHOD THEREFOR

(71) Applicant: Southeast University, Nanjing (CN)

(72) Inventors: Zhishen Wu, Jiangsu (CN); Caiqian Yang, Jiangsu (CN); An Sun, Jiangsu (CN); Wan Hong, Jiangsu (CN); Yongsheng Tang, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 155 days.

(21) Appl. No.: 14/945,279

(22) Filed: Nov. 18, 2015

(65) Prior Publication Data

US 2016/0084733 A1 Mar. 24, 2016
US 2017/0108403 A9 Apr. 20, 2017

Related U.S. Application Data

(63) Continuation-in-part of application No. PCT/CN2014/072967, filed on Mar. 6, 2014.

(30) Foreign Application Priority Data

Aug. 2, 2013 (CN) .......................... 2013 1 0332548

(51) Int. Cl.
   *G02B 6/02* (2006.01)
   *G01M 11/00* (2006.01)
(52) U.S. Cl.
   CPC ......... *G01M 11/00* (2013.01); *G02B 6/02076* (2013.01)
(58) Field of Classification Search
   CPC .. G01M 11/086; G01M 11/00; G01M 11/083; G01M 11/085; G02B 2006/02161;
   (Continued)

(56) References Cited

U.S. PATENT DOCUMENTS 8,306,373 B2 * 11/2012 Xia ...................... F01D 17/085
                                                 385/113

FOREIGN PATENT DOCUMENTS

CN        1949009 A      4/2007
CN      101275916 A     10/2008
(Continued)

OTHER PUBLICATIONS

Wu et al., Structural Identification Theories and SHM Design Methodology Based on Dynamic and Static Distributed Sensing Techniques, Structural Disaster Prevention, Monitoring and Controlling the Second "Structural Engineering New Progression International Forum Symposia," Abstract, Dec. 31, 2008, pp. 200-252.
(Continued)

*Primary Examiner* — Que T Le
(74) *Attorney, Agent, or Firm* — TraskBritt, P.C.

(57) ABSTRACT

A high-durability and long-scale-distance fiber grating sensor and a manufacturing method therefor, which relate to the technical field of fiber grating sensors. A fiber grating is disposed on the middle segment of a commercial optical fiber. A bushing, a woven fiber jacket layer, and a packaging structure are disposed on the periphery of the commercial optical fiber. The commercial optical fiber and the bushing therebetween are fixed by using fixing points in the bushing. Anchoring segments are disposed between the fixing points in the bushing and the woven fiber jacket layer. Two ends of the commercial optical fiber are sequentially connected to optical fibers on the anchoring segments and connecting optical fibers. Tail ends of the connecting optical fibers are connected to a transmission cable by using connecting flanges. By using the apparatus and the manufacturing method, the applicability and the durability of application of the fiber grating sensor in the civil traffic engineering field are improved, thereby providing a stable and reliable appa-
(Continued)

ratus for long-time detection and sound monitoring of large engineering structures in the civil traffic engineering field.

9 Claims, 4 Drawing Sheets

(58) Field of Classification Search
CPC ...... G02B 2006/12138; G02B 6/02066; G02B 6/021; G02B 6/34; G02B 6/02076; G02B 6/02123; G02B 6/02357; G02B 6/02104; G01L 1/246
USPC ...................................... 250/227.14, 227.18
See application file for complete search history.

(56) References Cited

FOREIGN PATENT DOCUMENTS

| CN | 101539403 A | 9/2009 |
|---|---|---|
| CN | 101738214 A | 6/2010 |
| CN | 201382777 Y | 12/2010 |
| CN | 201780103 U | 3/2011 |
| CN | 103438815 A | 12/2013 |
| KR | 1020080046046 A | 5/2008 |
| WO | 2015014126 A1 | 5/2015 |

OTHER PUBLICATIONS

PCT International Search Report, PCT/CN2014/072967, dated Jun. 11, 2014.

\* cited by examiner

//#HIGH-DURABILITY AND LONG-SCALE-DISTANCE FIBER GRATING SENSOR AND MANUFACTURING METHOD THEREFOR

CROSS-REFERENCE TO RELATED APPLICATIONS

This application is a continuation-in-part of International Patent Application PCT/CN2014/072967, filed Mar. 6, 2014, designating the United States of America and published in English as International Patent Publication WO 2015/014126 A1 on Feb. 5, 2015, which claims the benefit under Article 8 of the Patent Cooperation Treaty and under 35 U.S.C. §119(e) to Chinese Patent Application Serial No. 201310332548.1, filed Aug. 2, 2013, the disclosure of each of which is hereby incorporated herein in its entirety by this reference.

TECHNICAL FIELD

The application relates to the technical field of fiber Bragg grating sensors and as associated manufacturing method.

BACKGROUND

As important techniques for improving structural safety, disaster prevention, disaster mitigation, and intelligent management and maintenance in large-scale civil work and traffic engineering, structural health monitoring techniques have received extensive attention. Since the 1990s, the techniques have been studied comprehensively and applied in engineering projects in USA, Europe, and Asia (including Japan, China and Korea). Presently, structural health monitoring systems at different levels have been installed for large-scale new bridge structures in, for example, China.

However, most key sensing techniques in existing structural health monitoring systems for large-scale engineering structures in civil work and transportation infrastructures are sensing techniques that were applied early in aeronautic and astronautic, military, and precision machinery engineering, and even most structural damage identification theories were developed for homogeneous and small-size structures rather than large-scale civil work and transportation engineering structures. Conventional sensors have poor durability and are subject to severe interferences in sensing and data transmission. Therefore, they are only applicable to short-term and small-scale detection, but are generally unsuitable for long-term real-time monitoring in an embedded state, and cannot meet the requirement for long-term detection and structural health monitoring.

At present, the sensing and monitoring techniques for large-scale engineering structures such as bridges and tunnels are mainly classified into two types. One is a local sensing and monitoring technique, represented by conventional strain foils. The local sensing and monitoring technique is too "local" to capture the damage.

The second is a global sensing and monitoring technique, represented by accelerometers. For global sensing and monitoring techniques, it is so global that the measurements are in a quite poor relation to the damage. Furthermore, it is difficult if not impossible to employ the conventional sensing and monitoring techniques with a high cost and short sensing gauge for large-scale distributed deployment for large-scale civil work and transportation engineering structures. For example, for minor damages, if the strain foils or accelerometers are deployed away from the damage, it is difficult for such sensors to monitor damage information. However, if the strain foils or the like are deployed at some damages, such as cracks, the sensors may be damaged easily. Moreover, for dynamic measurement, it is difficult for an identification method based upon the global sensor dynamic measurement to reflect the overall performance of the structure and effectively capture the unpredictable damages of the structure.

With respect to the technical bottleneck of the application of the local sensing technique represented by conventional strain foils and the global sensing technique represented by accelerometers in the large-scale civil work and transportation engineering, it is necessary to propose new concepts and develop new sensing techniques on an area and distributed sensing for the area monitoring of critical zones of large-scale civil work and transportation engineering structures. Prof Zhishen Wu, Southeast University, P. R. China, and his team carried out technical research for improving the gauge length of traditional FBG sensors and developing long-gauge sensors. Chinese patent No. ZL 200610097290.1 discloses a distributed long gauge fiber Bragg grating (FBG) sensors, which is packaged by fiber-reinforced polymer (FRP) composites to make the traditional "point" FBG sensors have a distributed sensory function with a long gauge length, so as to achieve sensitizing enhancement and temperature self-compensation. However, the stability for long-term sensing and monitoring and the durability of the sensors need to be further improved. That Chinese patent does not consider the slippage problem of both anchoring ends of the long gauge sensors either. For large-scale engineering, such as civil work and transportation engineering, sensors used for long-term detecting and structural health monitoring need to have good stability for long-term sensing and durability, but the present conventional sensors can hardly meet the performance requirement of long-term monitoring in civil work and transportation engineering fields.

BRIEF SUMMARY

Described is a long gauge fiber Bragg grating (LG-FBG) sensor with high durability and long gauge length and a manufacturing method for the LG-FBG sensors for long-term sensing and health monitoring for large-scale engineering structures in civil work and transportation engineering fields, which can solve the problems of poor stability and durability of conventional FBG sensors in long-term sensing/monitoring in harsh environments, overcome the problems of slippage of fiber core and coating layer and stress concentration on the anchoring segment in the measuring process with LG-FBG sensors, and improve the applicability and durability of LG-FBG sensors in application in the civil work and transportation engineering fields. The LG-FBG sensor is an element for the distributed area sensing system for the large-scale civil work and transportation engineering structures.

The typical structure of an optical fiber is shown in FIG. 1. Usually, an optical fiber consists of a fiber core, a protecting layer, and a coating layer, wherein slippage may appear between the coating layer and the fiber core of the optical fiber, which has impacts on the measurement accuracy and long-term sensing stability. To overcome this problem, we have invented a design method of brittle failure-proofing anchoring segments based on variable elastic modulus on the basis of a vast amount of in-depth studies.

The disclosure employs the following technical scheme:

A manufacturing method for the LG-FBG sensors with high performance, long lifetime and long gauge length, comprising the following steps:

selecting: first, centering on the fiber Bragg grating and measuring out half sensing gauge length L/2 in both sides, and then determining the gauge length as AB, stripping off the coating layer of an optical fiber segment via an optical fiber coating stripping and packaging device, cleaning the optical fiber segment with acetone, ethanol or the like; then, threading the optical fiber segment through a bushing in length (L+2$l_0$) within the range of the sensing gauge length L via a bushing threading device, controlling the tension strain of the optical fiber with an optical fiber tension strain control device, and fixing the two ends of a fiber Bragg grating sensor to the end A and B of the bushing with resin via fixing devices in the bushing of the optical fiber, wherein the fixing length is $l_0$, and the optical fiber and optical grating on the gauge length segment are in tensioned state under 200-300με in the anchoring process, and then are permanently fixed to the two ends of the bushing 7;

manufacturing: fusion-splicing the individual fiber Bragg grating sensors with high-performance, long lifetime, and long gauge length to form a serial connection, enwinding the optical fiber fused with distributed fiber Bragg gratings or optical fiber inscribed with distributed fiber Bragg gratings on a reel drum, for the continuous packaging of the distributed optical fiber sensors; and under the traction of a traction and product collecting device, the reel drum unreel the optical fiber serially connecting with fiber Bragg gratings at a specific speed automatically; removing the coating layer on the anchoring segment automatically by an optical fiber coating stripping and packaging device, and packaging the optical fiber for anti-slip packaging at the same time, wherein the elastic modulus of the resin in the anchoring segment increases gradually from anchoring point A and B toward outer sides, respectively, i.e., a low-modulus resin is used for the head anchoring segment, a moderate-modulus resin is used for the middle anchoring segment, and a high-modulus resin is used for the tail anchoring segment, so that the shear stress transfer length is effectively increased and a purpose of reducing stress concentration in the anchoring segment is attained; unreeling basalt fibers for packaging from a fiber spool, and then weaving a basalt fiber reinforced jacket layer outside of the bushing and a commercial optical fiber in one way or two ways by a braiding machine, then, impregnating the anchoring segment in a modified epoxy resin by a resin impregnator device for anchoring segment, and impregnating the other parts with another type of modified epoxy resin; then, curing by a drying device in air or in a vacuum environment, fusion-splicing optical cables on the two ends of the long gauge sensors and collecting the product on the traction and product collecting device for standby use; wherein the entire process is controlled by an intelligent production control system. Each packaged LG-FBG sensor is an element of the area distributed sensing system.

Based on a long-term study, it has been found that the fiber reinforcing packaging self-adaptive to temperature deformation can be realized by using the basalt fibers as the packaging materials. Through a large amount of tests, it has been found that basalt fibers can ensure necessary fatigue-creeping strength. In addition, only basalt fibers can be used as a reinforcing material that is self-adaptive to the thermal expansion of optical fibers, while the thermal expansion coefficient of carbon fibers is almost zero and the thermal expansion coefficient of aramid fibers is even negative, as shown in FIG. 2. Though the thermal expansion coefficient of glass fibers is matched with the thermal expansion coefficient of optical fibers, the creeping strength of glass fibers is lower than that of optical fibers (<0.3× tensile strength); whereas, the thermal expansion coefficient of basalt fibers is matched with the thermal expansion coefficient of optical fibers and basalt fibers have higher creeping strength (>0.6× tensile strength). Through a large amount of tests, the creeping strengths of different types of fibers were studied, as shown in FIG. 3. Thus, packaging materials mentioned in the existing literature, such as carbon fibers, aramid fibers, and glass fibers, etc., are essentially unsuitable for use as the packaging material for LG-FBG sensors. In the disclosure, basalt fibers are used as the packaging material.

In addition, to further improve the fatigue-creeping resistance of the basalt fiber packaging material and the sensing effect of the packaged LG-FBG sensors, the basalt fibers are pre-tensioned under 500-1,000με usually for 1 hour or longer time before packaging. Force the fibers in the basalt fiber bundles in straight state as far as possible, so that the stress on the fiber packaging layer will be uniform when the packaged sensor is under stress. Thus, the overall fatigue-creeping resistance of the sensor can be greatly improved, and the long-term durability and measurement effect of the sensor can be ensured effectively.

As described herein, the epoxy resin for impregnating the anchoring segment is doped with 0.05-5 mass % anti-aging agent and 0.5-20 mass % reinforcing phase, wherein the reinforcing phase is mixed from one or more of carbon black, carbon nanotubes, ceramic particles, metal particles, metal oxide particles, and chopped fibers in 3-8 mm lengths. On the one hand, the mechanical properties (e.g., fatigue-creeping) and the viscoelastic behaviors of the resin in the anchoring segment can be improved, to prevent slippage of the optical fibers on the anchoring segment. On the other hand, the long-term durability of the anchoring segment can be greatly improved. The epoxy resin for impregnating the other parts is doped with 0.05-5 mass % anti-aging agent, in order to improve the durability (e.g., ultraviolet protection) of the packaged LG-FBG sensors.

Preferably, the anti-aging agent according to this disclosure is mixed from one or more of benzotriazoles, benzophenones, hindered phenols, hindered amines, triazines and salicylates, and the reinforcing phase is mixed from one or more of carbon black, carbon nanotubes, ceramic particles, metal particles, and metal oxide particles.

Preferably, the bushing in this disclosure is selected from 0.2-2.0 mm (inner diameter) glass capillary tube, fine metal tube, or high-performance polymer tube.

The stability and durability of the LG-FBG sensors with a long lifetime, high-precision, and high durability and long gauge length according to this disclosure in long-term sensing/monitoring in open-air and harsh environments are realized by means of a special basalt fiber composite packaging design, wherein an anti-aging agent is added in the substrate resin of the composite packaging material to improve the aging resistance and durability of the material under light radiation and varying temperature and humidity conditions; a variable elastic modulus resin substrate is used for the anchoring segment, and the low elastic modulus resin coating layer on the optical fiber of the anchoring segment is removed in the packaging process, in order to alleviate or even avoid the problem of slippage of the fiber core and coating layer in the measuring process; in addition, to enable the fiber Bragg grating sensor to have an area sensing function, a bushing in length L (gauge length) is fitted over the fiber Bragg grating, so as to ensure the optical fiber in the bushing is in a free deformation state and form a uniform strain field. The area sensing elements of LG-FBG sensors can effectively sense and monitor the strain and damage of large-scale civil and transportation works, especially for the large-scale reinforced concrete structures. Moreover, a plurality of LG-FBG sensors can be connected in series to realize an area distributed sensing and monitoring for the large-scale civil and transportation structures. According to the structural mechanics and vulnerability analysis, a plurality of LG-FBG sensors are optimally arranged on the key and vulnerable sections of the large-scale structure, and an area distributed sensing and monitoring can be successfully realized. If the whole structure is quite important or vulnerable, a series of connected LG-FBG sensors are fully arranged to cover all the parts of the structure, and then all areas distributed sensing and monitoring can be realized for large-scale civil and transportation works. Both the area distributed sensing and all areas distributed sensing cannot be realized with the traditional local and global sensors with a short gauge length, such as the traditional electrical strain gauges, point FBG sensors and some others. To that end, the following four problems must be solved:

1) Realization of long lifetime: since resin is a macromolecular material, it is subject to aging by solar radiation and rains in harsh and open-air environments in civil work and transportation projects; consequently, the long-term measurement accuracy and stability may be degraded severely. According to the disclosure, the impregnating resin is adulterated with an anti-aging agent, which is mixed from one or more of benzotriazoles, benzophenones, hindered phenols, hindered amines, triazines and salicylates, so that the lifetime and long-term stability of the fiber Bragg grating sensor with long gauge length are greatly improved; in addition, an optical fiber with a coating layer can be penetrated by 248 nm laser is selected for producing optical gratings, and the optical gratings can be produced under the pulsed light from a high-power excimer laser without stripping off the coating layer; thus, on one hand, the damage resistance of the optical gratings can be effectively improved; on the other hand, the optical gratings can have waterproof and moisture-proof properties, and thereby the lifetime and stability of the optical gratings can be further improved.

2) Realization of long gauge length: the key measure in the technique is the use of a free packaging bushing; the long gauge sensing segment including the fiber Bragg grating is threaded through the bushing, the inner wall of the bushing should be uniform and smooth, and the coefficient of friction with the optical fiber should be small, so that the optical fiber in the long gauge sensing segment can move freely, and a uniform strain field can be formed under the stress; according to the actual engineering requirements, usually a polymer bushing or metal bushing should be selected for the free packaging bushing, and a glass capillary bushing can be used too; the gauge length of the LG-FBG sensors in an important parameter for the area distributed and all areas distributed sensing technique, and only the sensors with suitable gauge length can cover the critical areas of large-scale civil and transportation structures.

3) Variable elastic modulus, anti-slippage and brittle failure-proofing anchoring design: the anchoring design is featured with variable modulus, anti-slippage and brittle failure-resistant anchoring, and the interface processing techniques that can improve fatigue-creeping resistance performance are employed. Two measures are mainly used: first, the coating layer of the optical fiber on the anchoring segment is removed; second, variable elastic modulus resin is used for packaging the basalt fiber composite material, so that the modulus of the interface between the optical fiber and the packaging composite material is greatly improved; on the long gauge sensing segment, the elastic modulus of the resin in the anchoring segment increases gradually in a gradient pattern from the inner anchoring points toward the outer anchoring points, respectively, i.e., a low-modulus resin is used for the head anchoring segment, a moderate-modulus resin is used for the middle anchoring segment, and a high-modulus resin is used for the tail anchoring segment, so as to effectively increase the shear stress transfer length on the anchoring segment, attain a purpose of reducing stress concentration on the anchoring segment, and greatly improve the fatigue-creeping resistance of the anchoring segment.

4) The packaging layer is self-adaptive to temperature deformation of the optical fiber: through studying the adaptivity of different fiber packaging layers to the optical fiber, the inventor has found that a packaging layer made of specially treated basalt fibers has the best adaptivity to temperature deformation of optical fibers. First, the surface of basalt fibers is treated by spraying a layer of infiltration agent that has a good infiltration effect for epoxy resin; then, the basalt fibers are pre-tensioned under 500-1,000µε for 1 hour or longer time, so that the fibers in the basalt fiber bundles are in straight state. The thermal expansion coefficient of the basalt fiber reinforcing packaging layer is close to the thermal expansion coefficient of the optical fiber, and the fatigue-creeping strength of the basalt fiber packaging layer after special treatment is higher, up to 0.6× fracture strength of basalt fibers or higher, and the packaging layer has outstanding adaptability to temperature deformation of the optical fiber; in contrast, the thermal expansion coefficient of a carbon fiber packaging layer is almost zero, and the thermal expansion coefficient of an aramid fiber packaging layer is even negative, and both of them are quite different from the thermal expansion coefficient of the optical fiber and, thus, such a packaging layer is not adaptive to temperature deformation of the optical fiber, which lead to lowering the sensing accuracy and precision of the LG-FBG sensors; though the thermal expansion coefficient of a glass fiber packaging layer is matched with the thermal expansion coefficient of the optical fiber, the creeping strength of glass fibers is low, and is usually lower than 0.3× tensile strength of the glass fibers, and the long-term durability of glass fibers is also an important issue, which have an impact on the long-term sensing stability and performance of the LG-FBG sensors, especially in strong alkaline environment of concrete structures.

5) Pre-tensioning treatment of optical grating: furthermore, in the manufacturing process, the optical fiber and optical grating on the long gauge segment are pre-tensioned, so that the fiber Bragg grating and optic fiber are in a tensioned state; in addition, the compression strain can be measured. The magnitude of the pretension strain can be determined according to the magnitude of the measured compression strain; usually, to avoid possible slippage of the optical fiber in a long-term pre-tensioned state, the pretension strain is controlled within the range of 200-300µε, and the optical fiber and optical grating in pre-tensioned state is permanently fixed to the two ends of the bushing 7.

The packaged LG-FBG sensors with high-performance, long lifetime and long gauge length can be connected in series, to implement an area distributed or all areas distributed long-term sensing/monitoring. The LG-FBG sensors can be fusion-spliced with an ordinary optical cable, so as to transmit data through the optical cable. The packaged LG-FBG sensors have outstanding aging and corrosion resistance, and can be attached to the surfaces of civil work or transportation engineering structures or embedded thereof for long-term sensing and health monitoring with outstanding measuring stability and accuracy.

Steam and water have severe impacts on the long-term measurement performance of optics fiber sensors. Therefore, in the manufacturing process of LG-FBG sensors with high-performance, long lifetime and long gauge length, the two ends of the bushings should be tightly sealed to prevent the intrusion of water and steam.

With the technical scheme described above, this disclosure has the following advantages over the prior art:

1) Long lifetime: since the sensors are packaged with a basalt fiber material and modified resin (with high aging resistance and high toughness), the durability and long-term measuring stability of the sensors are essentially improved, and the sensors are suitable for long-term sensing and health monitoring for civil work and transportation engineering structures in open-air and harsh environments.

2) High measuring accuracy and precision: to prevent optical fiber slippage that has impacts on the measuring accuracy of sensors, the coating layer of the optical fiber on the anchoring segment is removed, the anchoring segment is lengthened, and a modified variable modulus resin is used to coat the anchoring segment again. Thus, the anti-slippage property and fatigue-creeping resistance properties of the optical fiber are greatly improved, and thereby the measuring accuracy and precision are improved.

3) Long gauge sensing: with a long gauge sensing technique, the mean strain in a specific zone of a large-scale civil work or transportation engineering structure can be obtained, and the impact of stress concentration in a concrete structure resulted from factors such as cracking on the monitoring result can be avoided. Thus, the measuring result can reflect the stress strain characteristic of the structure more accurately.

Distributed sensing: the LG-FBG sensors can be connected in series for the measurement, so as to cover a range as wide as possible on a large-scale civil work or transportation engineering structure in an area distributed manner, to even monitor the entire structure in all areas distributed manner; in addition, the information of a large-scale structure, such as deformation distribution and curvature information, etc., can be obtained from the distributed long gauge strain (macro-strain). Hence, such sensors are suitable for sensing and monitoring the large-scale civil work and transportation engineering structures.

5) Versatility: the LG-FBG sensors can be used for dynamic and static sensing/monitoring and global and local sensing/monitoring for structures, and can be used to obtain comprehensive information of parameters of structures, including strain, deformation, curvature, frequency, mode, and vibration mode, etc. Thus, such a type of long gauge sensors are characterized by a multi-function property.

In the Figures: 1—optic fiber core; 2—protecting layer; 3—coating layer; 4—fiber Bragg grating; 5—commercial optical fiber; 6—packaging structure; 7—bushing; 8—basalt fiber reinforced jacket layer; 9—anti-aging resin; 10—filling medium; 11—fixing point in bushing; 12—anchoring segment (12-1—low-rigidity anchoring segment; 12-2—moderate-rigidity anchoring segment; 12-3—high-rigidity anchoring segment); 13—optical fiber on anchoring segment; 14—anti-aging reinforced resin; 15—connecting optical fiber; 16—transmission optical cable; 17—connecting flange; 18—sensitizing enhancing packaging segment; 19—resin; 20—anti-aging agent; 21—reinforcing phase; 22—single LG-FBG sensor; 23—reel drum; 24—fiber coating stripping and packaging device; 25—bushing threading device; 26—fixing device in fiber bushing; 27—fiber tension strain control device; 28—fiber spool; 29—basalt fiber; 30—braiding machine; 31—resin impregnator device for anchoring segment; 32—resin impregnator device; 33—drying device; 34—traction and product collecting device; 35—intelligent production control system.

DETAILED DESCRIPTION

The technical scheme of this disclosure will be further detailed hereinafter, with reference to the accompanying drawings.

According to the function and measuring accuracy, the LG-FBG sensors with high durability and long gauge length can be classified into three types: basic type, filled type and sensitizing enhanced type.

Figure 1:
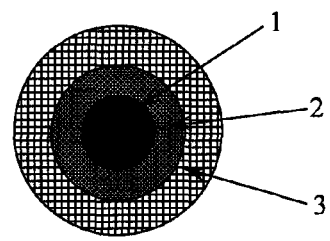
FIG. 1: Schematic structural diagram of a commonly used commercial optical fiber.
Figure 2:
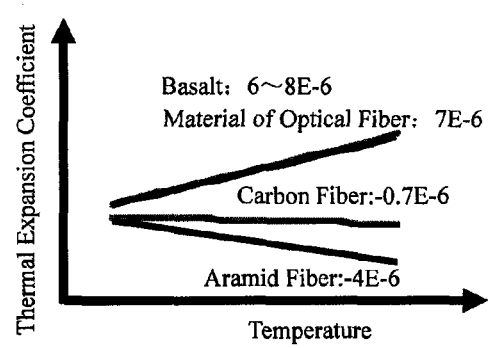
FIG. 2: Temperature expansion coefficients of different types of fiber materials.
Figure 3:
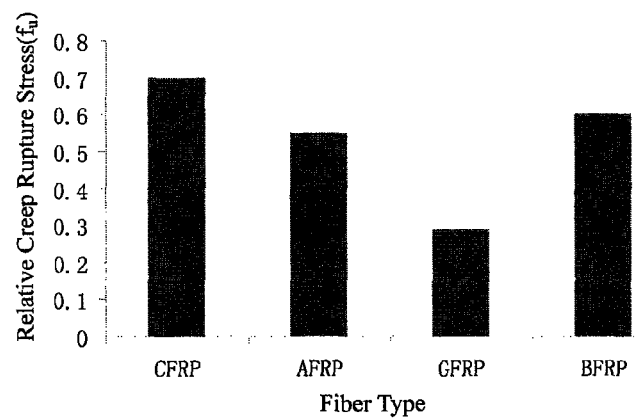
FIG. 3: Creeping strengths of different types of fiber materials.
Figure 4:
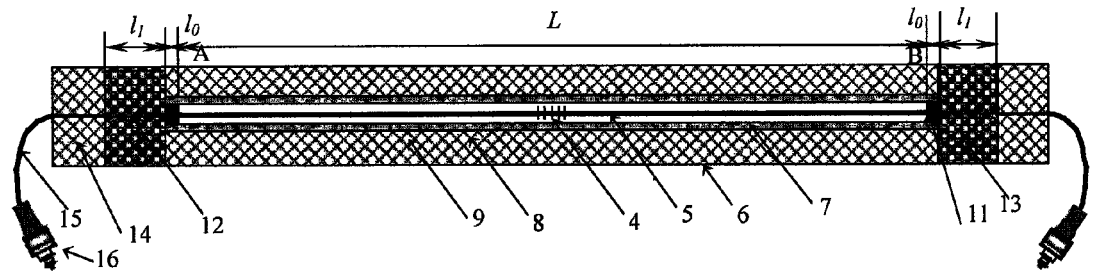
FIG. 4: Schematic structural diagram of a basic type of LG-FBG sensors with high durability and long gauge length.

1) As shown in FIG. 4, a basic type of LG-FBG sensor comprises a commercial optical fiber 5 in length L, the coating layer of the commercial optical fiber can be penetrated by 248 nm excimer laser, and optical fiber Bragg grating can be inscribed without stripping off the coating layer; a fiber Bragg grating 4 is arranged on the middle segment of the commercial optical fiber 5, a bushing 7 is arranged on the periphery of the commercial optical fiber 5, a specially designed basalt woven reinforced fiber jacket layer 8 and a packaging structure 6 are arranged on the periphery of the commercial optical fiber 5, and the commercial optical fiber 5 are fixed to the bushing 7 via fixing points 11 in the bushing in length $l_0$; anchoring segments 12 in length $l_1$ are arranged, respectively, between the fixing points 11 in the bushing and the woven basalt fiber enhanced jacket layer 8; the two ends of the commercial optical fiber 5 are connected sequentially with optical fibers 13 on the anchoring segments and connecting optical fibers 15, and the tail ends of the connecting optical fibers 15 are connected to transmission optical cables 16 through connecting flanges 17.

Figure 5:
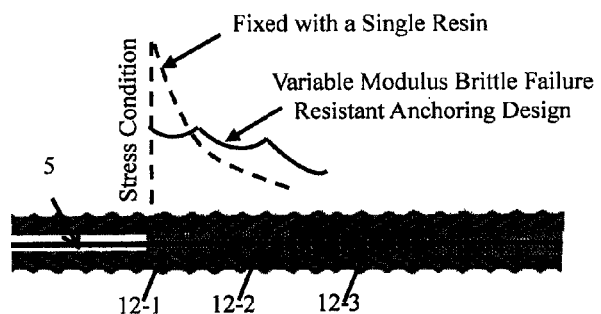
FIG. 5: Schematic diagram of a variable modulus anchoring segment.

The manufacturing process mainly includes the following steps:

Step 1: determine the sensing gauge length L, remove the coating layer on the optical fiber in length $l_0+l_1$, at the anchoring points 11 in the bushing at the two ends of the sensing gauge segment and on the anchoring segment 12, ensure the length of the anchoring segment 12 is longer than the effective shear stress transfer length, and clean the optical fiber;

Step 2: protect the optical fiber 13 on the anchoring segment by packaging after the coating layer is removed, and ensure the elastic modulus of the protecting layer and interface matches the elastic modulus of the fiber core, so as to reduce the impact of slippage in the measuring process on the measuring accuracy on one hand, and protect the optical fiber after the coating layer is removed on the other hand; employs a modified variable modulus resin for the resin in the anchoring segment, i.e., the elastic modulus of the resin for the anchoring segment decreases from the anchoring points at the two ends of the measuring segment toward outer sides, respectively, which is to say, a low-modulus resin is used for the head anchoring segment, a moderate-modulus resin is used for the middle anchoring segment, and a high-modulus resin is used for the tail anchoring segment, so as to effectively increase the shear stress transfer length and reduce stress concentration in the anchoring segment. As shown in FIG. 5, the structure of the anchoring segment 12 consists of a low-rigidity anchoring segment 12-1, a moderate-rigidity anchoring segment 12-2, and a high-rigidity anchoring segment 12-3;

Step 3: fix a commercial optical fiber 5 to the two ends of the bushing 7, and apply appropriate pre-stress in the fixing process to ensure the optical fiber is in tensioned state in the manufacturing process and meet the requirement for measurement of compression strain;

Step 4: weave a basalt fiber jacket layer 8 automatically on the periphery of the bushing 7, optical fiber 13 on the anchoring segment, and connecting optical fiber 15 with a braiding machine 30, wherein the fibers 29 are specially treated basalt fibers;

Step 5: impregnate the anchoring segment 12 of the LG-FBG sensors in an anti-aging reinforced resin 14;

Step 6: impregnate fully the packaging structure 6 of the LG-FBG sensor and the connecting optical fiber 15 in an anti-aging resin 9;

Step 7: cure the LG-FBG sensor impregnated in resin, and connect the LG-FBG sensor with a transmission optical cable 16.

Figure 6:
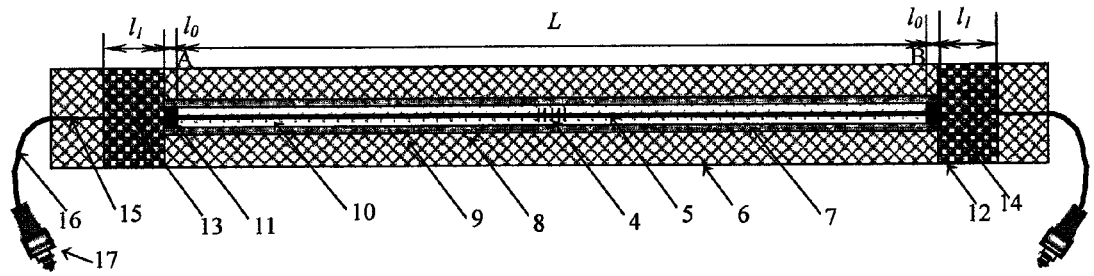
FIG. 6: Schematic structural diagram of a filled type of LG-FBG sensors with high durability and long gauge length.

2) A filled type of LG-FBG sensor that is applicable to humid and high-vibration harsh environments, as shown in FIG. 6. Compared with the basic type of LG-FBG sensor, the main difference lies in the filling medium filled into the bushing 7, and the difference in the manufacturing process mainly lies in the step 3, i.e., when the connecting optical fibers 5 are fixed to the two ends of the bushing 7, the filling medium 10 is filled into the bushing and then the bushing is tightly sealed; the medium can be an inert gas or grease-like liquid, such as carbon dioxide, nitrogen, or lubricant grease, etc. Filled type sensors are mainly applied in humid and harsh environments, such as underground works, and can effectively prevent water and steam from intruding into the bushing and causing impacts on the durability and measuring accuracy of the sensors; in addition, the oil filled into the bushing can effectively buffer external vibrations and reduce the impacts of external vibrations on the measuring accuracy of the optical grating sensors. Hence, filled type sensors are suitable for use in circumstances where the sensing gauge length is long.

Figure 7:
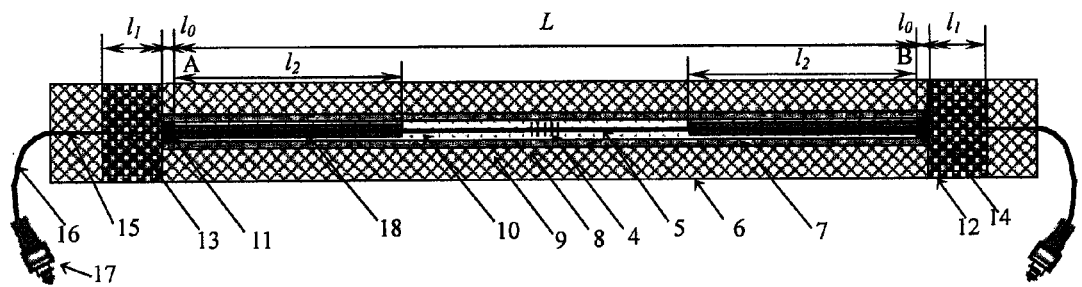
FIG. 7: Schematic structural diagram of a sensitizing enhanced type of LG-FBG sensors with high durability and long gauge length.

3) A sensitizing enhanced type of LG-FBG sensor is shown in FIG. 7. Compared with a basic type or filled type of LG-FBG sensor, the main difference lies in that the optical fiber in the bushing 7 has a sensitizing-enhancing packaging segment 18. The manufacturing process mainly includes the following steps:

Step 1: determine the sensing gauge length L and the sensitizing enhancing coefficient, determine the length $l_2$ of the sensitizing-enhancing packaging segment according to the sensitizing enhancing coefficient, remove the coating layer on the optical fiber in length $l_0+l_1+l_2$ on the anchoring points 11 in the bushing at the two ends of the sensing long gauge segment, on the anchoring segment 12, and on the sensitizing enhancing packaging segment, and clean the optical fiber;

Step 2: protect the optical fiber 13 on the anchoring segment by packaging after the coating layer is removed, employ a variable modulus resin in the packaging process to ensure the elastic modulus of the protecting layer and the interface matches the elastic modulus of the fiber core, so as to reduce the impacts of slippage in the measuring process on the measuring accuracy on one hand and protect the optical fiber after the coating layer is removed on the other hand;

Step 3: determine the length of the sensitizing-enhancing packaging segment and the sensitizing enhancing packaging material according to the sensitizing enhancing coefficient, and package the sensitizing-enhancing packaging segment 18 with a high-modulus material to improve the rigidity of the segment, so that the deformation of the sensor under stress will uniformly concentrate near the fiber Bragg grating within a range of $L-2l_2$:

Step 4: fix a connecting optical fiber 5 to the two ends of the bushing 7, and apply appropriate pre-stress in the fixing process to ensure the optical fiber is in tensioned state in the manufacturing process and meet the requirement for measurement of compression strain;

Step 5: weave a basalt fiber enhanced jacket layer 8 automatically on the periphery of the bushing 7, optical fiber 13 on the anchoring segment, and connecting optical fiber 15 with a braiding machine 30, wherein the fibers 29 are basalt fibers;

Step 6: impregnate the anchoring segment 12 of the LG-FBG sensor in an anti-aging reinforced resin 14;

Step 7: impregnate fully the sensing long gauge segment 6 of the LG-FBG sensor and the connecting optical fiber 15 in an anti-aging resin 9;

Step 8: cure the LG-FBG sensor impregnated in resin, and connect the LG-FBG sensors with a transmission optical cable 16.

Design of Resins for Manufacturing the LG-FBG Sensors with High Durability and Long Gauge Length:

The resins are the important factors for the durability and precision of LG-FBG sensors. Altogether, two kinds of modified resins are used in the manufacturing process of LG-FBG sensors with high durability and long gauge length.

Figure 8:
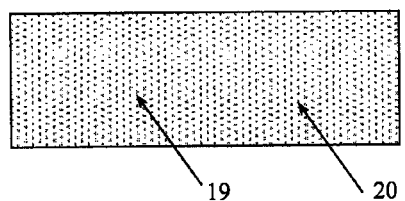
FIG. 8: Schematic diagram of anti-aging resin.
Figure 9:
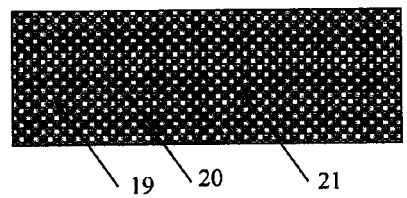
FIG. 9: Schematic diagram of anti-aging reinforced resin.

One kind of modified resin is anti-aging resin 9, as schematically shown in FIG. 8. The anti-aging resin 9 is prepared by adding an anti-aging agent 20 into a resin 19, the adding amount is usually 0.05-5 mass %, the anti-aging agent is mixed from one or more of benzotriazoles, benzophenones, hindered phenols, hindered amines, triazines and salicylates; the anti-aging resin is mainly used for packaging the packaging structure 6 and the connecting optical fibers 15. The other kind of modified resin is anti-aging reinforced resin 14, as schematically shown in FIG. 9. This type of resin is prepared by adding an anti-aging agent 20 and a reinforcing phase 21 into a resin 19, wherein the material and mass percent of the anti-aging agent are the same as those of the anti-aging agent added into the anti-aging resin 9; the reinforcing phase 21 added into the resin 19 is mixed from one or more of carbon black, carbon nano-tubes, ceramic particles, metal particles, metal oxide particles and chopped fibers in 3-8 mm length, and the mass percent of the reinforcing phase 21 is 0.5-20%. The resin 19 is mainly an epoxy resin. For sensors with a long gauge length, an epoxy resin that is soft after fixing can be used, to facilitate product transportation and installation. After the particles or chopped fibers of a reinforcing phase are added at an appropriate ratio into the anti-aging and reinforcing resin 14, the mechanical properties (e.g., fatigue-creeping resistance) of the anchoring segments of the optical fiber can be greatly improved and slippage can be prevented, so that the anchoring segments will not have cracking, slippage, delamination, or similar phenomena under long-term loading, and thereby the long-term durability of the sensor can be improved greatly.

Figure 10:
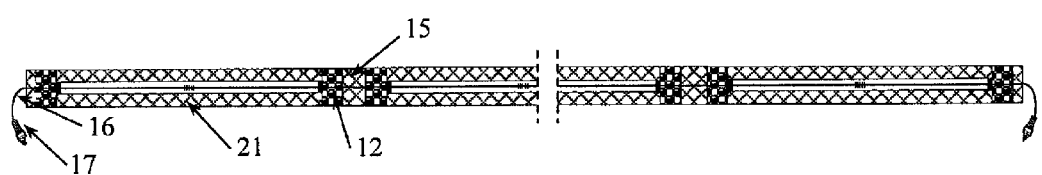
FIG. 10: Schematic structural diagram of distributed LG-FBG sensors with high durability and long gauge length.
Figure 11:
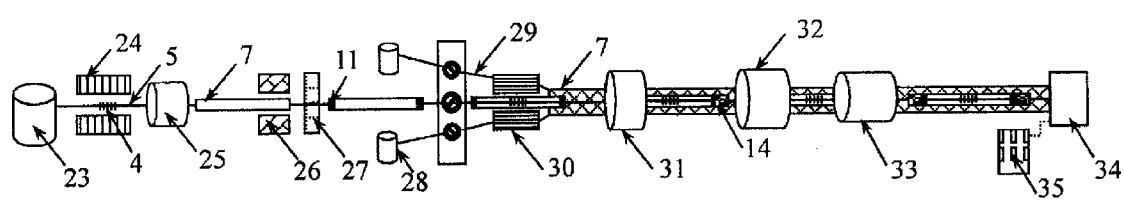
FIG. 11: Schematic diagram of the manufacturing process of distributed LG-FBG sensors with high durability and long gauge length.

Distributed Sensor Design:

Distributed LG-FBG sensors are formed by connecting a plurality of LG-FBG sensors in series. Usually, there are two ways to realize distributed sensing, as shown in FIG. 10.

One way is to connect individual LG-FBG sensors prepared in advance in series by an optical cable and deploy the sensors in a distributed layout on an engineering structure to be measured.

The other way is integral packaging, which is essentially the same as that for individual LG-FBG sensors, and mainly includes the following steps:

Step 1: before packaging, connect fiber Bragg grating sensors in series by an optical fiber or inscribe distributed optical gratings on a commercial optical fiber coated with a coating layer that can be penetrated by 248 nm excimer laser, and reserve an appropriate distance between adjacent fiber Bragg grating sensors according to the requirement for measurement;

Step 2: remove the coating layer on the optical fiber on the fixing points 11 in the bushing and on the anchoring segments at both ends of each LG-FBG sensor by segment, and clean each segment, wherein two adjacent LG-FBG sensors can share the anchoring segment between them according to the distance between the adjacent optical gratings, but the length of each anchoring segment must be $\geq 2l_1$; for sensitizing enhanced LG-FBG sensors, the coating layer on the optical fiber of the sensitizing enhancing packaging segments 18 must be removed too;

Step 3: thread each fiber Bragg grating sensor connected in series through the bushing 7 in length $L+2l_0$, and ensure the sensing gauge length is L, wherein the bushing can be selected from polymer bushing, metal bushing, or glass capillary bushing, etc., and the inner diameter of the bushing is usually 2-3 times of the diameter of the optical fiber;

Step 4: fix the fiber Bragg grating sensor in pre-tensioned state to the two ends of the bushing of each sensor, in fixing length $l_0$, wherein, on a premise that the fiber Bragg grating sensor is in tensioned state, the magnitude of the pretension strain can be determined according to the magnitude of compression strain to be monitored to ensure the two ends of the bushing are tightly sealed; for filled type of LG-FBG sensors, a filling medium should be filled into the bushing 7 when the commercial optical fiber 5 is fixed to the two ends of the bushing, wherein the filling medium can be an inert gas (e.g., carbon oxide or nitrogen) or grease-like material.

Step 5: weave a fiber-reinforced jacket layer with specially designed basalt fiber material outside of the fiber Bragg grating sensors connected in series on a braiding machine, wherein the jacket layer can be woven in one way or in two ways;

Step 6: impregnate the anchoring segments $l_1$ and other parts (L and connecting segments) with an anti-aging reinforced resin and an anti-aging resin, respectively, wherein the anchoring segments are impregnated and packaged with modified variable modulus resin to decrease the stress concentration around the anchoring segments; finally, carry out curing and connect the optical cable.

Anchoring of LG-FBG Sensors:

The packaged LG-FBG sensors with long lifetime, high-precision, and long gauge length have a favorable bonding property with concrete structures, and are compact in size and light in weight. Thus, these sensors not only can be easily installed and deployed on the surfaces of civil work and transportation engineering structures, but also can be easily embedded in large-scale engineering structures without compromising the mechanical properties of the structures. A key point in the installation and deployment is to ensure the anchoring segment 12 of each LG-FBG sensor with long lifetime, high-precision, and long gauge length is coupled tightly to the structure to be measured, while other parts are bonded to the structure.

In view of the characteristics of long gauge of the LG-FBG sensors, the following two main installation and deployment methods are put forth here.

1) Surface Deployment

Surface deployment can be classified into fully distributed surface deployment and locally distributed surface deployment.

Fully distributed surface deployment: for large-scale civil work or transportation engineering structures, since the damage positions and damage degrees are highly random, the LG-FBG sensors are bonded along the surface of the structure to be measured by a resin in a fully distributed manner, so as to fully monitor the structure.

Locally distributed surface deployment: although the civil work and/or transportation engineering structures are large-scale, the possible damage zones and the zones with large strain/stress can be predicted on the basis of engineering experience and theoretical analysis; consequently, the LG-FBG sensors are deployed at positions where the strain is large and damages may occur easily.

2) Embedded Deployment

For prefabricated structures, LG-FBG sensors can be embedded previously in the structure. Embedded deployment can also be classified into fully distributed embedded deployment and locally distributed embedded deployment.

Fully distributed embedded deployment: for a large-scale engineering structure in which the damage positions and degrees can't be predicted in detail, distributed LG-FBG sensors are deployed along steel bars or along a specific direction, and then concrete is cast; or, grooves are made in the structures, and the grooves are filled up with resin or putty, etc., after the LG-FBG sensors are deployed.

Locally distributed embedded deployment: the strain distribution and possible damage positions in the structure are predicted on the basis of engineering experience and theoretical analysis, LG-FBG sensors are deployed at the corresponding steel bars before casting the concrete; or, grooves are made in the structure, and the grooves are filled up with resin or putty, etc., after the LG-FBG sensors are deployed.

In the manufacturing process, first, center on the fiber Bragg grating 4 and measure out half sensing gauge length L/2 in each side, and then determine the gauge length as AB. Then, measure out another fixing point and anchoring length $l_0+l_1$ in each side outward the half sensing gauge length L/2, the coating layer on the optical fiber segment is removed by an optical fiber coating stripping and packaging device, the optical fiber segment is cleaned with acetone or ethanol, and then is packaged again with a tough modified variable modulus resin. Next, the optical fiber is threaded through the bushing 7 within the range of the gauge length L by a bushing threading device 25, wherein the bushing can be a 0.2-1.0 mm glass capillary tube, metal tube, or high-performance polymer tube, and the coefficient of friction between the inner wall of the bushing and the optical fiber should be as small as possible, so as to form a uniform strain field; the two ends of a fiber Bragg grating sensor is fixed to the two ends A and B of the bushing with a resin with appropriate elastic modulus that matches with the elastic modulus of the optical fiber, and the fixing length is $l_0$; in the fixing process, the optical fiber is pre-tensioned appropriately, and the magnitude of the pre-stress to be applied is determined according to the requirement for measurement of compression strain, on a premise that the optical fiber is in tensioned state.

The individual LG-FBG sensor with long lifetime, high-precision and long gauge length is fused to form a serial connection, the optical fibers of distributed fused serial LG-FBG sensors or optical fibers of distributed inscribed optical gratings are enwound on a reel drum 23, so as to continuously package the distributed optical fiber sensors. For distributed inscribed optical gratings, the inscription can be carried out on an optical fiber with special coating layer that can be penetrated by 248 nm excimer wavelength laser, to avoid the drawback of stripping off the coating layer before inscription of fiber Bragg gratings in the prior art. That approach can effectively improve the damage resistance of the sensor and improve the service life and the resistance of moisture and water of the fiber Bragg grating. The advantages of directly inscribing on an optical fiber are: it is unnecessary to connect individual fiber Bragg grating sensors in series by fusion splicing to form a serial distribution layer; instead, a serial distribution layer can be formed naturally; thus, the fusion-splicing process of individual fiber Bragg gratings is simplified, the optical loss in the measurement process is greatly reduced, and the strength of the optical fiber is improved.

The packaging for LG-FBG sensors with long lifetime, high-precision and long gauge length can be accomplished in a production line: under the traction of a traction device 34, an optical fiber serial connecting with optical gratings 4 is unreeled automatically from the reel drum 23 at a specific speed. The coating layer 3 on the optical fiber at the fixing points 11 in the bushing and on the anchoring segments 12 is removed automatically by an optical fiber coating stripping and packaging device 24, and anti-slip packaging is accomplished with a tough modified variable modulus resin. Bushings are mounted by a bushing threading device 25, and the length of each bushing is $L+2l_0$, wherein the bushing can be selected from glass capillary tube, metal tube, or polymer tube, according to the operating environment. The tension strain of the optical fiber is strictly controlled by means of an optical fiber tension strain control device 27, the magnitude of the tension strain is set according to the magnitude of the measured compression strain on a premise that the optical fiber is in a strained state; then, the two ends of the optical fiber is firmly fixed to the bushing 7 by fixing devices 26 in the bushing. A specially designed basalt fiber 29 for packaging is unreeled from a fiber spool 28, and a basalt fiber jacket layer is woven outside of the bushing 7 and optical fiber 5 in one way or in two ways by a braiding machine 30. At a resin impregnator device for anchoring segment 31, the anchoring segment 12 is impregnated with an epoxy resin adulterated with 0.05-5 mass % anti-aging agent 20 and 0.5-20 mass % reinforcing phase 21, and the other parts are impregnated with an epoxy resin adulterated with 0.05-5 mass % anti-aging agent 20, wherein the anti-aging agent 18 is mixed from one or more of benzotriazoles, benzophenones, hindered phenols, hindered amines, triazines, and salicylates, and the reinforcing phase 21 is mixed from one or more of carbon black, carbon nano-tubes, ceramic particles, metal particles, metal oxide particles, and chopped fibers in 3-8 mm length. Finally, curing is carried out by a drying device 33, and optical cables are fusion-spliced on the two ends of the long gauge sensor, and the product is collected by a product collecting device 34 for subsequent use. The entire process system is controlled by an intelligent production control system 35.

The comparative study on the sensing properties of bare FBG sensors and packaged LG-FBG sensors were performed under different environments. The gauge length of the applied LG-FBG sensors is 30 cm. For each type of environmental condition, three specimens were fabricated and tested. The results of sensitive coefficients bare FBG and packaged LG-FBG sensors under fatigue loading are shown in Table 1, wherein the data are the averages of three specimens. It is shown that in contrast to the bare FBG sensors, the packaged LG-FBG sensors are characterized by excellent sensing stability, including the sensitive coefficients and their standard deviation. Even after 2 million loading circles, the change in sensitive coefficients is only 0.65%, while that is nearly 3% for the bare FBG sensors.

TABLE 1

Sensitive coefficient changes of bare FBG and packaged LG-FBG sensors under fatigue

| Specimens | loading Fatigue load/ million | Average sensitivity/ pm/με | Standard deviation | Change rate/% |
|---|---|---|---|---|
| Bare FBG sensors | 0 | 1.21733 | 0.021385 | — |
| | 0.25 | 1.21966 | 0.018824 | 0.1917 |
| | 0.50 | 1.22766 | 0.028729 | 0.8488 |
| | 0.75 | 1.21633 | 0.012858 | 0.7820 |
| | 1.00 | 1.23600 | 0.020075 | 1.5334 |
| | 2.00 | 1.24926 | 0.216531 | 2.6231 |
| Packaged LG-FBG sensors | 0 | 1.08966 | 0.004163 | — |
| | 0.25 | 1.08566 | 0.004041 | 0.3670 |
| | 0.50 | 1.08166 | 0.003512 | 0.7340 |
| | 0.75 | 1.08900 | 0.008660 | 0.0610 |
| | 1.00 | 1.09566 | 0.009866 | 0.5500 |
| | 2.00 | 1.09625 | 0.009921 | 0.6011 |

In order to study the durability of the packaged LG-FBG sensors under different corrosion conditions, the specimens were tested under three types of corrosive conditions, which are acidic, alkaline and salt solutions. For each corrosive condition, five specimens were fabricated, and the average values of these five specimens are used. To simulate the natural acidic rain condition, the acid solution has a PH value of 3.0, which is a little larger than that of the natural acidic rain (3.5-5.6); the alkaline solution with a PH of 13.5 was made with $Ca(OH)_2$, KOH and NaOH to simulate the alkaline condition of concrete; the salt solution was made of NaCl (5.2 g/L), $MgCl_2$ (4.1 g/L), $Na_2SO4$ (1.2 g/L) and $CaCl_2$ (1.0 g/L). The results are shown in Table 2. Even after 12 weeks corrosion under acidic, alkaline and salt solutions, the change in sensitivity is smaller than 1.0%, and their standard deviation is smaller than 0.009. All the results reveal that the packaged LG-FBG sensors have excellent long-term sensing stabilities.

TABLE 2

Sensitive coefficient changes of packaged LG-FBG sensors under different corrosion condition

| Corrosion condition | Time/Weeks | Average Sensitivity/ pm/$\mu\epsilon$ | Standard deviation | Change rate/% |
|---|---|---|---|---|
| Acid solution | 0 | 1.100 | 0.008815 | — |
|  | 3 | 1.099 | 0.008814 | −0.0360 |
|  | 6 | 1.105 | 0.006124 | +0.4363 |
|  | 12 | 1.106 | 0.006126 | +0.5424 |
| Alkaline solution | 0 | 1.099 | 0.006580 | — |
|  | 3 | 1.103 | 0.008990 | +0.3638 |
|  | 6 | 1.108 | 0.007460 | +0.7641 |
|  | 12 | 1.109 | 0.007568 | +0.9017 |
| Salt solution | 0 | 1.106 | 0.015250 | — |
|  | 3 | 1.095 | 0.005220 | −0.9940 |
|  | 6 | 1.102 | 0.003870 | −0.3800 |
|  | 12 | 1.108 | 0.004271 | +0.1808 |

What is claimed is:

1. A long gauge Fiber Bragg Grating (LG-FBG) sensor comprising, from interior to exterior, a fiber core comprising: an optical fiber, a protecting layer, and a coating layer, wherein:
   a fiber Bragg grating is arranged on a middle segment of the optical fiber;
   a protecting layer comprising a bushing, a woven basalt fiber-enhanced jacket layer, and a packaging structure is arranged on the periphery of the optical fiber, and further wherein
   the optical fiber is fixed with the bushing via fixing points in the bushing;
   anchoring segments are arranged between the fixing points in the bushing and the woven basalt fiber-enhanced jacket layer;
   the two ends of the optical fiber are connected with optical fibers on the anchoring segments and connecting optical fibers, respectively; and
   the tail ends of connecting optical fibers are connected with a transmission optical cable through connecting flanges.

2. The LG-FBG sensor of claim 1, wherein the coating layer can be penetrated by a 248 nm excimer laser and can produce the optical gratings for the optical fibers without stripping off the coating layer.

3. The LG-FBG sensor of claim 2, wherein the bushing contains a filling medium that comprises carbon dioxide, nitrogen, or lubricant grease.

4. The LG-FBG sensor of claim 2, wherein the optical fiber is wrapped with a sensitizing enhanced packaging segment on its periphery from each of the two ends to the fiber Bragg grating.

5. The LG-FBG sensor of claim 1, wherein the bushing is filled with a filling medium comprising an inert gas.

6. The LG-FBG sensor of claim 1, wherein the anchoring segment is anchored with a variable modulus resin, including a low-modulus resin for a head anchoring segment, a moderate-modulus resin for a middle anchoring segment, and a high-modulus resin for a tail anchoring segment.

7. The LG-FBG sensor of claim 1, wherein the woven basalt fiber-enhanced jacket layer fibers have been pre-tensioned for at least 1 hour under 500-1,000$\mu\epsilon$.

8. The LG-FBG sensor of claim 1, wherein the optical fiber and optical grating on a long gauge segment thereof are tensioned under 200-300$\mu\epsilon$ and then permanently anchored to the two ends of the bushing.

9. The LG-FBG sensor of claim 1, wherein the bushing is a glass capillary tube, a fine metal tube, or a high-performance polymer tube.

* * * * *